June 12, 1962  C. VAN DER LELY ET AL  3,038,290
SIDE DELIVERY RAKE AND TEDDER
Original Filed Nov. 28, 1955  2 Sheets-Sheet 1

Cornelis van der Lely and
Ary van der Lely
INVENTOR.

BY Mason, Mason and Albright

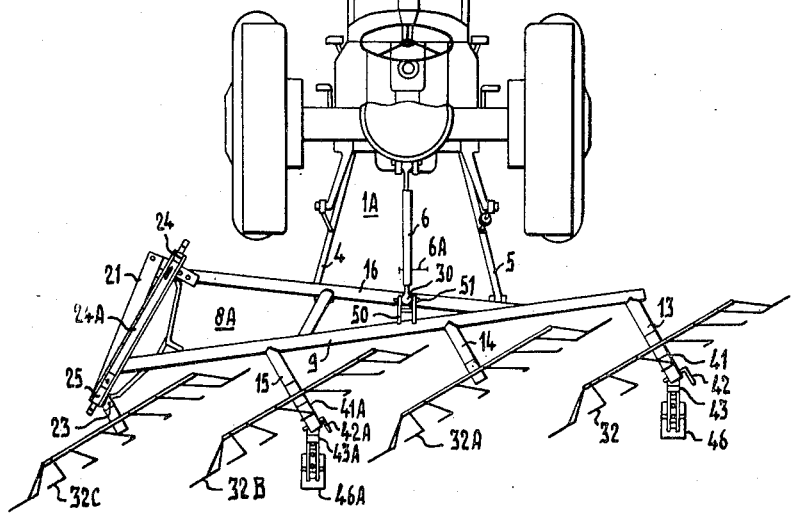
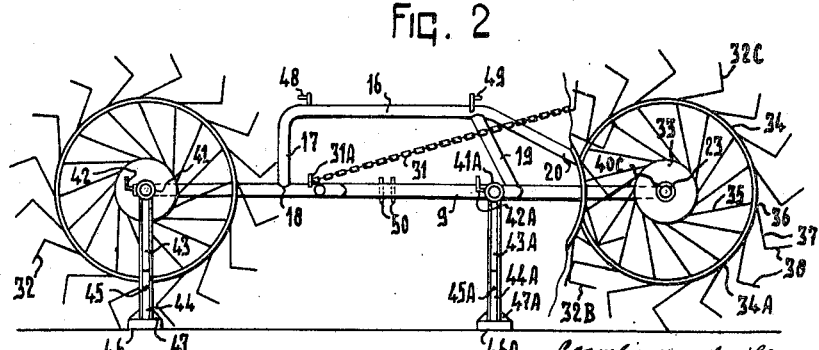

United States Patent Office 3,038,290
Patented June 12, 1962

3,038,290
SIDE DELIVERY RAKE AND TEDDER
Cornelis van der Lely and Ary van der Lely, Maasland, Netherlands, assignors to C. van der Lely N.V., Maasland, Netherlands, a Dutch limited liability company
Original application Nov. 28, 1955, Ser. No. 549,525. Divided and this application Apr. 28, 1959, Ser. No. 809,463
6 Claims. (Cl. 56—366)

This invention relates to a farm implement for raking, swath turning, and tedding of hay or similar substance, or for weeding, loosening the soil, etc. More particularly, the invention relates to agricultural raking implements with raking members rotatably attached to the frame of the implement. In order to use the implement for different functions, various parts of the implement have the characteristic of being releasable or displaceable.

In farming, occasions frequently arise in tilling the soil or harvesting that several distinct steps, each of short duration, are required in sequence. For this purpose, a farm implement capable of simple adaptation to perform the various required steps can be a great time and money saver.

It is an object of this invention to provide such a farm implement which has a simple but rugged type of support and can be adapted to different uses by simple modifications.

This is a divisional application of my application Serial No. 549,525, filed November 28, 1955, now abandoned.

According to the invention, the farm implement has first and second working positions for different operations. The details of the invention may be understood by reference to the accompanying drawings wherein an embodiment of a device according to the invention has been illustrated by way of example and which:

FIGURE 2 shows a side elevation of the same implement viewed in the direction of the arrow II in FIGURE 1 with certain of the raking members not shown for the sake of clarity.

FIGURE 3 shows a plan elevation of the same implement attached to a lifting device of a tractor in the working position of a tedder.

Figure 1:
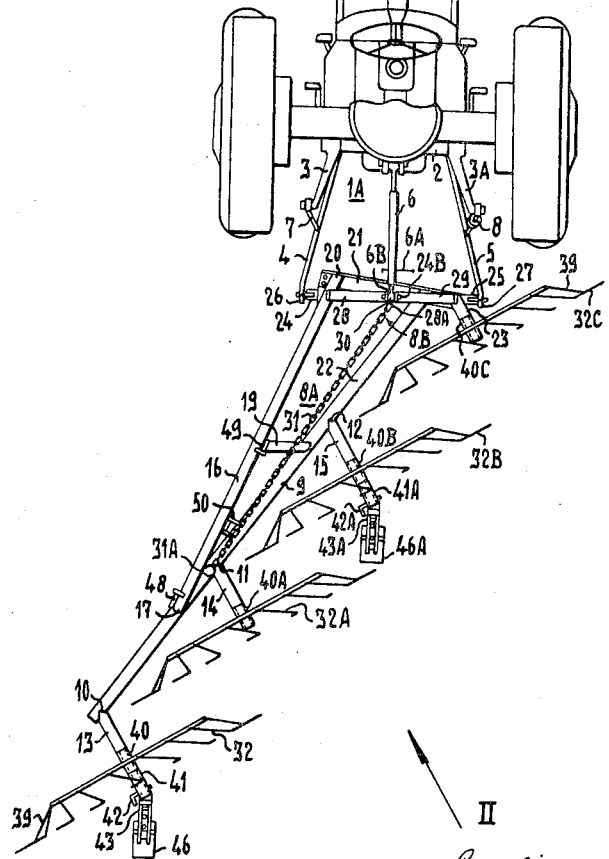
FIGURE 1 shows a plan elevation of the farm implement attached to a lifting device of a tractor in the working position of a side delivery rake.

According to FIGURE 1, the rear axle housing 2 of tractor 1 is provided with a lifting device designated generally as 1A consisting of two arms 3 and 3A which can be moved upwards and downwards by means of engine power. Rearwardly extending lifting bars 4 and 5, located in about the same plane and suspended by the free extremities of arms 3 and 3A by tie rods 7 and 8, move together with arms 3 and 3A. A central rearwardly extending lifting bar 6 is located between bars 4 and 5 as shown in FIGURE 1. Bar 6B is telescopically connected within bar 6 and can be adjustably secured therein by a pin 6A.

The farm implement fixed to the tractor 1 through lifting device 1A comprises a frame designated generally as 8A consisting substantially of a frame part or a rake supporting beam comprising a horizontal tube 9 in which mutually parallel horizontal axles 13, 14 and 15 are mounted at points 10, 11, and 12; and of a further frame part or beam comprising tube 16, the extremity 17 which is bent downwards (see also FIGURE 2) and attaches to tube 9 at 18. Tubes 16 and 9 are intermediately connected by means of a short tube 19. End 20 of tube 16 is connected to the corresponding end 22 of tube 9 by means of a still further frame part or beam comprising horizontal bar 21. The bar 21 carries an axle 23 which is parallel to axles 13, 14 and 15 and is coplanar with them. An axle 24A (see FIGURE 3), the extremities of which are designated by 24 and 25 and is adjustably connected in such a way to the bar 21 that the angle which the tube 9 makes within a horizontal plane with the length of the tractor 1 can be modified within certain limits. In this connection, as will be noted from FIGURE 3, axle 24A may be U-shaped in cross section. It will be apparent that axle 24A may pivot around the pin near extremity 25. A locking pin may be provided near extremity 24 whereby axle 24A may be secured relative to bar 21 by fixing the locking pin in the apertures in the portion of bar 21 shown to extend under extremity 25. This general type of construction is, of course, old in the art as exemplified by disclosure in Patent Numbers 2,447,354 and 2,658,324. The extremities 24 and 25 of axle 24A incorporate coupling or securing means which are conected hingedly with free ends 26 and 27 of bars 4 and 5, respectively. The two supporting bars 28 and 29 extend obliquely upwards from near ends 24 and 25 respectively. The upper ends of bars 28 and 29 are hingedly connected to bar 6B. The lower ends of bars 28 and 27 are connected at their lower ends to the frame 8A. A chain 31 extends from the end 30 of bar 6B to a hook 31A attached near 18 to tube 9.

Four rake wheels 32, 32A, 32B and 32C are rotatably mounted upon axles 13, 14, 15 and 23. Rake wheels 32, 32A and 32B are each identical to rake wheel 32C which is composed of a hub 33, a rim 34, and steel wires 35. An end of each of the steel wires 35 on a given rake wheel is fixed to hub 33. Each such wire 35 leads from the hub 33 to rim 34 and through an aperture in the rim 34 (such as the aperture 34A in FIGURE 2). Inside the rim 34, the steel wires 35 are located in the plane of the rim 34. Outside the rim, every steel wire is bent at 36 and proceeds as supporting member 37 for a tooth 38 which is constituted by the extremity of the steel wire 35, said tooth 38 being approximately parallel to the part of the steel wire 35 which is located inside rim 34. Hub 33 and corresponding hubs of each of the rake wheels are journaled on axles 13, 14, 15, and 23 by means of bushings 40, 40A, 40B, and 40C, respectively. Axles 13 and 15 extend through bushings 40 and 40B and carry further bushings 41 and 41A respectively. A hole is bored through bushing 41 and axle 13 and also through bushing 41A and axle 15. Said holes are perpendicular to the center lines of said axles 13 and 15 and intersect said center lines. Locking pins 42 and 42A are placed in said holes. Bushings 41 and 41A carry at their lower portions arms 43 and 43A having sliding portions 44 and 44A which can be secured in definite positions by means of locking bolts 45 and 45A. Sliding portions 44 and 44A carry at their bottoms ground engaging means comprising shoes 46 and 46A which have raised front parts 47 and 47A to enable them to slide along the ground with ease.

Tube 16 of the frame carries a coupling or securing means comprising two pins 48 and 49 which are in alignment and can be fixed to ends 26 and 27 of bars 4 and 5. The supporting bars 28 and 29 are released from end 30 of bar 6B and the securing means constituting ends 24 and 25 are released from ends 26 and 27. In a like manner, chain 31 is released from end 30, unhooked from 31A, and removed. The frame is then turned over. Pin 49 is connected to end 26; pin 48 is connected to end 25; and end 30 of bar 6B is secured to the securing means comprising fork 50 mounted on tube 9—all as shown in FIGURE 3.

In this working position, bushings 41 and 41A with arms 43 and 43A and shoes 46 and 46A are rearranged relative to the frame in a position turned 180° about axles 13 and 15, respectively, in respect to the position they occupied according to FIGURES 1 and 2. This is obtained by removing pins 42 and 42A, turning the bushings about their axles 180° with respect to the frame and reapplying the pins 42 and 42A.

In the position shown in FIGURES 1 and 2, the implement works as a side delivery rake when the tractor travels forward. The frame of the rake is supported by ends 24 and 25 and by shoes 46 and 46A. It will be noted that in this position the frame is hingeable about a line between ends 24 and 25. In normal operations, the chain 31 is slack and no force is exerted on end 30 of bar 6B. The chain 31 which secures bar 6B to tube 9 can easily be shortened or lengthened by connecting different links or lengths of chain to hook 31A. When the lifting device is actuated to lift the implement, chain 31 will soon be strained and will limit the angle between the frame and the fastening device, the latter comprising, inter alia, supporting bars 28 and 29. The rake wheels 32, 32A, 32B and 32C and shoes 46 and 46A will thereupon leave the ground.

The side delivery rake shown in FIGURE 1 will deliver the material on the ground being raked to the left by means of rotation of the rake wheels during forward movement, unless, of course, it has been raised by the lifting device in which case it can be transported.

When the implement is attached to the tractor as shown in FIGURE 3, it works as a tedding device—each rake wheel, 32, 32A, 32B and 32C, individually working the material on a narrow strip of ground. These strips are adjacent and close to each other in view of a correctly chosen distance between axles 13, 14, 15 and 23. In operation, bars 4, 5 and 6 are in an unlocked and independently hingeable position, owing to which the implement can continually adapt itself to the ground.

The above description and drawings disclose a single embodiment of the invention and specific language has been employed in describing the figures. It will, nevertheless, be understood that no limitations of the scope of the invention are thereby contemplated, and that various alterations and modifications may be made as would occur to one skilled in the art to which the invention relates.

We claim:

1. For combination with a tractor having a 3-point lift mechanism, an attachment for side delivery raking and tedding having an elongated frame comprising at least three frame parts, each of said frame parts being rigidly attached to each of the other of said frame parts, at least two distinct coupling means for providing operative connection to said tractor's 3-point lift mechanism, the first of said coupling means being secured to one of said frame parts, the second of said coupling means being secured to a second of said frame parts, axles extending from the third of said frame parts, and a plurality of rake wheels mounted in overlapping echelon on said axles whereby said attachment is a side delivery rake when said first mentioned coupling means are connected to said tractor and a tedder when said second mentioned coupling means are connected to said tractor.

2. For combination with a tractor having a 3-point lift mechanism with two lower bars and one central bar extending outwardly and rearwardly from said tractor, an attachment for side delivery raking and tedding having an elongated frame comprising at least three frame parts, each of said frame parts being rigidly attached to each of the other of said frame parts whereby said frame is substantially of triangular shape with said frame parts constituting the sides of the triangle, at least two distinct coupling means for providing connection to said lower bars of said tractor's 3-point lift mechanism, the first of said coupling means being secured to one of said frame parts, the second of said coupling means being secured to a second of said frame parts, a third and a fourth coupling means for selective connection with said central bar of said 3-point lift mechanism, said third and fourth coupling means being secured to the third of said frame parts, axles extending from the third of said frame parts, and a plurality of rake wheels mounted in overlapping echelon on said axles, whereby said attachment is a side delivery rake when said first mentioned coupling means are connected to said tractor and a tedder when said second mentioned coupling means are connected to said tractor.

3. An implement constituting a side delivery rake and tedder comprising a frame, a frame beam included in said frame, said frame beam provided with a row of rake wheels obliquely arranged with regard to the intended direction of travel of the implement, supports extending substantially rigidly from said frame beam rotatably mounting said rake wheels, said frame being provided at a first place thereon with means for connecting it to a tractor with the implement as a side delivery rake, said frame being provided at a second place with additional means for connecting it to a tractor whereby the implement operates as a tedder.

4. In combination with a tractor having two rearwardly extending bars, a farm implement attachment for side raking and tedding comprising a rake supporting beam having echelon of overlapping rake wheels thereon, a second beam rigidly secured at an acute angle to said rake supporting beam, first securing means carried by said second beam adapted to be hingedly connected to said bars whereby when so connected said attachment is a side delivery rake, a third beam rigidly secured opposite said second beam at an acute angle to said rake supporting beam, and second securing means carried by said third beam adapted to be hingedly connected to said bars whereby when so connected said attachment is a tedder.

5. In combination with a tractor having a lifting mechanism with two rearwardly extending lifting bars, a farm implement attachment for side raking and tedding comprising a rake supporting beam having overlapping rake wheels in echelon thereon, a second beam fixedly connected at an acute angle to said rake supporting beam, securing means carried by said second beam adapted to be hingedly connected to said lifting bars whereby when so connected said attachment is a side delivery rake, a third beam fixedly connected at an acute angle to said rake supporting beam at a place thereon spaced from the connection of said second beam on said rake supporting beam and also rigidly secured to said second beam at a place thereon spaced from its connection with said rake supporting beam, further securing means carried by said third beam adapted to be hingedly connected to said lifting bars whereby when so connected said attachment is a tedder.

6. In combination with a tractor having lifting mechanism with two rearwardly extending lifting bars and a central rearwardly extending lifting bar, a farm implement attachment for side raking and tedding comprising a rake supporting beam having overlapping rake wheels in echelon mounted thereon, a second beam fixed at an acute angle to said rake supporting beam and carrying securing means adapted to be hingedly connected to said lifting bars whereby when so connected said attachment is a side delivery rake, a third beam fixed at an acute angle to said rake supporting beam, said second beam and said third beam being rigidly fixed together at an obtuse angle, said third beam carrying further securing means adapted to be hingedly connected to said lifting bars whereby when so connected said attachment is a tedder, ground engaging support means selectively interconnected to said rake supporting beam, a third and a fourth securing means on said rake supporting beam for selective connection to said central bar, said third securing means being used with said first mentioned securing means and said fourth securing means being used with said second mentioned further securing means for lifting said implement in its positions either as a side delivery rake or as a tedder.

References Cited in the file of this patent

FOREIGN PATENTS

| 1,084,872 | France | July 13, 1954 |
| 531,552 | Belgium | Sept. 30, 1954 |